(12) United States Patent
Bhargava et al.

(10) Patent No.: US 12,141,381 B2
(45) Date of Patent: Nov. 12, 2024

(54) SELECTIVE GESTURE RECOGNITION FOR HANDHELD DEVICES

(71) Applicant: Google LLC, Mountain View, CA (US)

(72) Inventors: Dev Bhargava, San Francisco, CA (US); Alejandro Kauffmann, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/547,459

(22) PCT Filed: Feb. 22, 2021

(86) PCT No.: PCT/US2021/019007
§ 371 (c)(1),
(2) Date: Aug. 22, 2023

(87) PCT Pub. No.: WO2022/177578
PCT Pub. Date: Aug. 25, 2022

(65) Prior Publication Data
US 2024/0126384 A1    Apr. 18, 2024

(51) Int. Cl.
*G06F 3/038* (2013.01)
*G06F 3/01* (2006.01)
(Continued)

(52) U.S. Cl.
CPC ............ *G06F 3/0383* (2013.01); *G06F 3/017* (2013.01); *G06F 3/0346* (2013.01); *G06F 3/011* (2013.01);
(Continued)

(58) Field of Classification Search
CPC ........ G06F 3/0383; G06F 3/011; G06F 3/014; G06F 3/017; G06F 3/0346; G06F 2203/0383; G06F 2203/0384; G06N 20/00
(Continued)

(56) References Cited

U.S. PATENT DOCUMENTS 7,301,526 B2 * 11/2007 Marvit .................. G06F 1/1694
345/158
9,000,887 B2    4/2015 Linsky et al.
(Continued)

OTHER PUBLICATIONS

International Search Report for Application No. PCT/US2021/019007, mailed on Oct. 11, 2021, 3 pages.
(Continued)

*Primary Examiner* — Tom V Sheng
(74) *Attorney, Agent, or Firm* — DORITY & MANNING P.A.

(57) ABSTRACT

The present disclosure is directed to selective gesture recognition for handheld device gestures. An example method includes receiving, by a handheld interactive object, movement information descriptive of a gesture performed with the handheld interactive object. The method includes selecting a local and/or remote machine-learned model for processing the movement information. The movement information can be processed to identify a gesture action corresponding to the movement information. The local and/or remote machine-learned model can be selected based on user input data and/or a complexity of the movement information. In response to selecting the local machine-learned model, the method includes processing the movement information according to the local machine-learned model and communicating a message to a remote device based on the result. In response to selecting the remote ma-chine-learned model, the method includes communicating the movement
(Continued)

information to the remote device for processing in accordance with the remote machine-learned model.

20 Claims, 9 Drawing Sheets

(51) Int. Cl.
    *G06F 3/0346*     (2013.01)
    *G06N 20/00*     (2019.01)

(52) U.S. Cl.
    CPC ...... *G06F 3/014* (2013.01); *G06F 2203/0383* (2013.01); *G06F 2203/0384* (2013.01); *G06N 20/00* (2019.01)

(58) Field of Classification Search
    USPC ........................................................ 345/156
    See application file for complete search history.

(56) References Cited

U.S. PATENT DOCUMENTS

| | | |
|---|---|---|
| 10,281,994 B2 | 5/2019 | Sayah |
| 10,534,437 B2 | 1/2020 | Godby et al. |
| 2005/0212749 A1* | 9/2005 | Marvit .................... G06F 3/017 345/156 |
| 2005/0212750 A1* | 9/2005 | Marvit .................. G06F 1/1686 345/156 |
| 2005/0212751 A1* | 9/2005 | Marvit .................. G06F 1/1694 345/156 |
| 2007/0259716 A1* | 11/2007 | Mattice .................... G07F 17/32 463/36 |
| 2012/0127089 A1* | 5/2012 | Waas ....................... G06F 3/017 345/173 |
| 2016/0195928 A1* | 7/2016 | Wagner .................... G06F 1/163 345/156 |
| 2016/0313801 A1* | 10/2016 | Wagner .................... G06F 1/163 |
| 2020/0081516 A1 | 3/2020 | Zyskind et al. |
| 2020/0320412 A1 | 10/2020 | Gillian et al. |
| 2021/0026440 A1* | 1/2021 | Poupyrev ................. A43B 3/34 |
| 2021/0034188 A1* | 2/2021 | Kwon .................. G06F 3/03545 |
| 2022/0075995 A1* | 3/2022 | Mayer .................... H04N 7/147 |
| 2022/0269350 A1* | 8/2022 | Gillian .................. G06F 3/0346 |
| 2023/0061808 A1* | 3/2023 | Gillian ................ G06F 9/44505 |

OTHER PUBLICATIONS

International Search Report for Application No. PCT/US2021/019007, mailed on Aug. 31, 2023, 9 pages.

\* cited by examiner

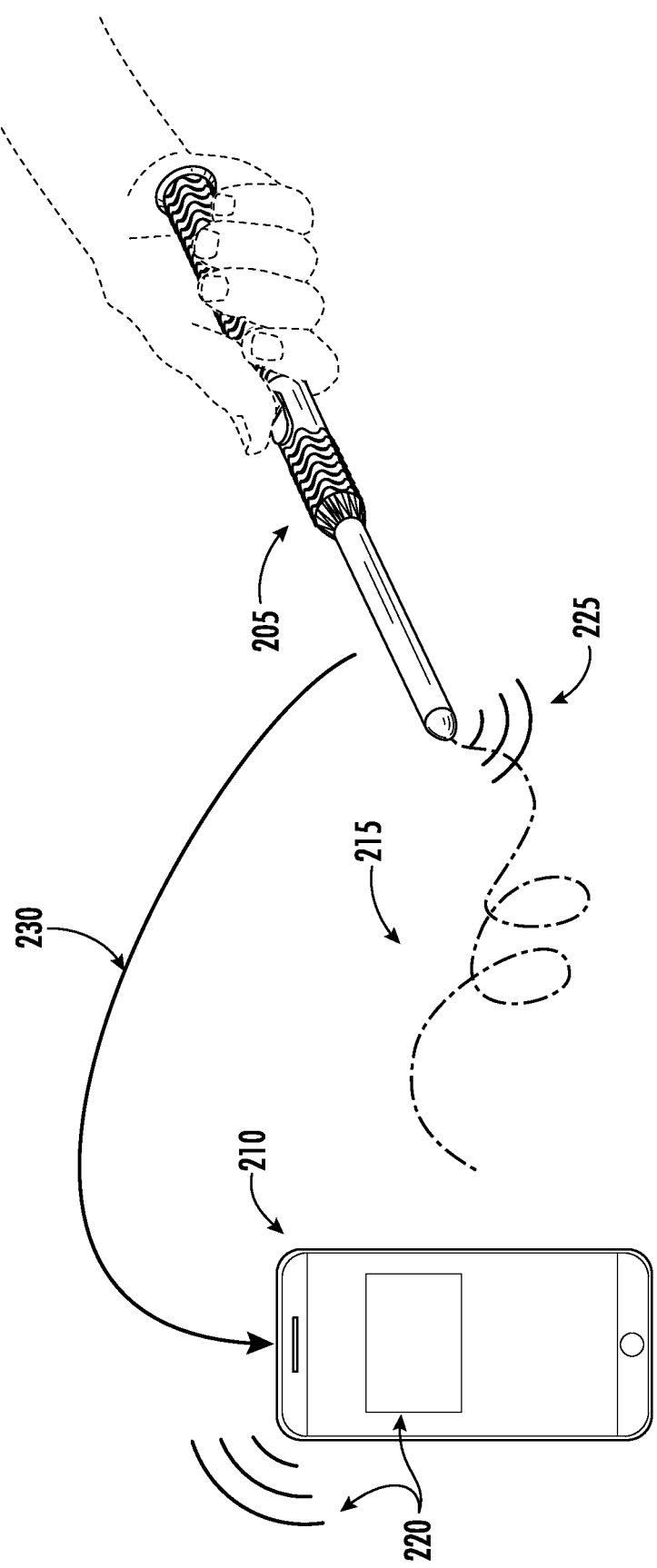

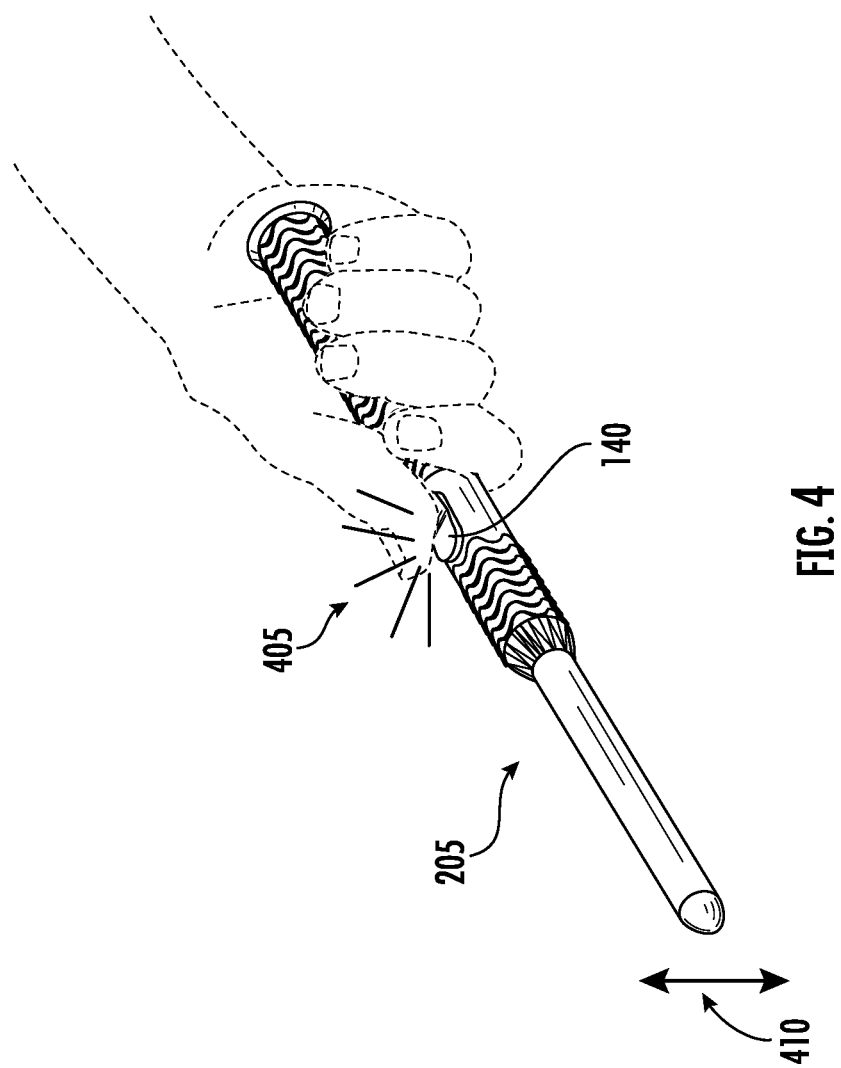

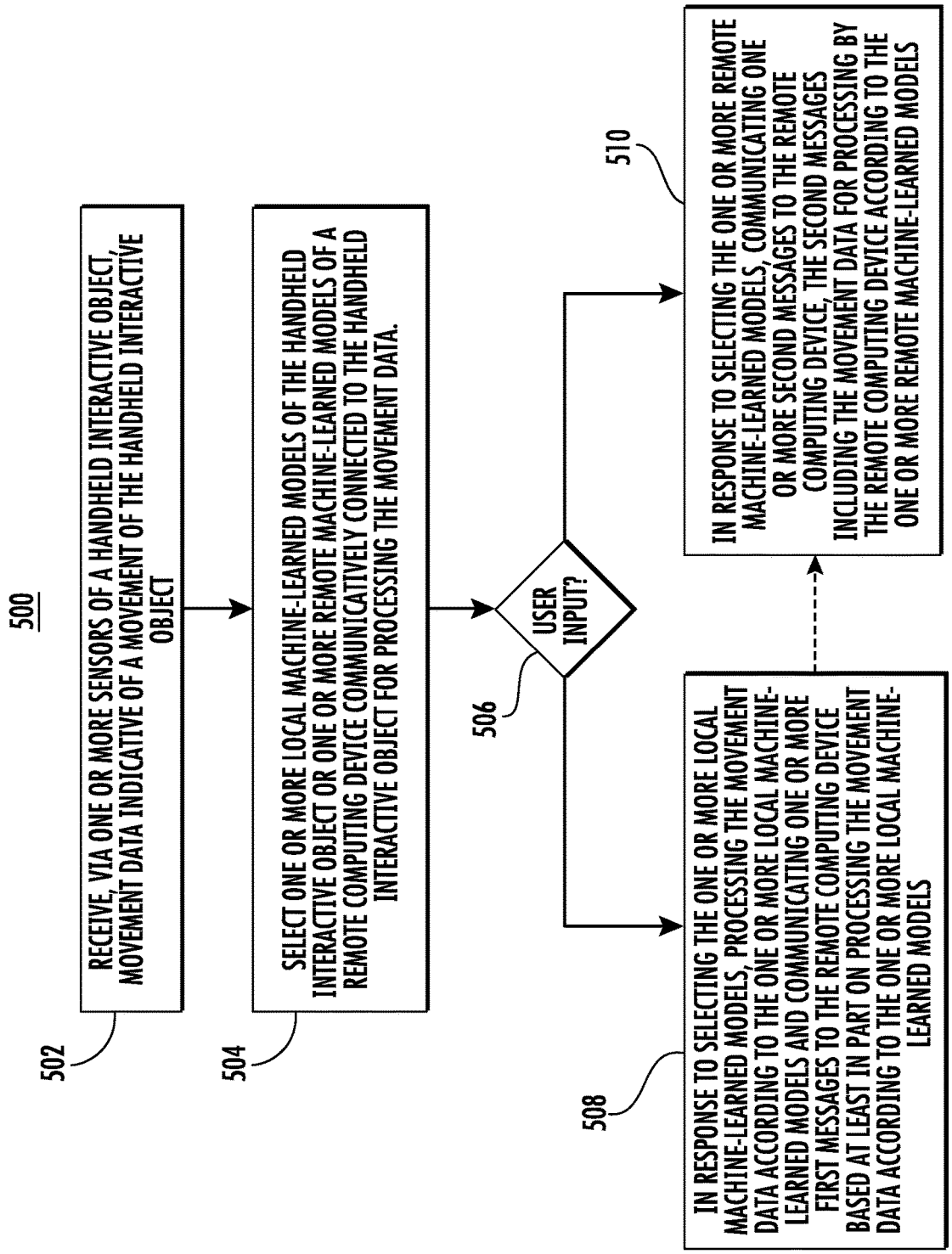

SELECTIVE GESTURE RECOGNITION FOR HANDHELD DEVICES

PRIORITY CLAIM

This application is based upon and claims the right of priority under 35 U.S.C. § 371 to International Application No. PCT/US2021/019007 filed on Feb. 22, 2021, which is incorporated by reference herein in its entirety.

FIELD

The present disclosure relates generally to gesture recognition for handheld devices. More particularly, the present disclosure relates to selectively processing movement information descriptive of gestures performed with a handheld device.

BACKGROUND

Movement information descriptive of a gesture performed with a handheld device can be recorded by sensors of the handheld device. The movement information can be processed to identify a corresponding gesture. The handheld device or another computing device can initiate an action in response to the corresponding gesture.

SUMMARY

Aspects and advantages of embodiments of the present disclosure will be set forth in part in the following description, or can be learned from the description, or can be learned through practice of the embodiments.

Aspects of the present disclosure are directed to a computer-implemented method for device pairing. The method includes receiving, by a handheld interactive object via one or more inertial measurement units, movement data indicative of a movement of the handheld interactive object. The method includes selecting, by the handheld interactive object, one or more local machine-learned models of the handheld interactive object or one or more remote machine-learned models of a remote computing device communicatively coupled to the handheld interactive object for processing the movement data. The one or more local machine-learned models are trained to identify a first subset of gesture actions performed with the handheld interactive object and the one or more remote machine-learned models are trained to identify a second subset of gesture actions performed with the handheld interactive object. The method includes, in response to selecting the one or more local machine-learned models, processing, by the handheld interactive object, the movement data according to the one or more local machine-learned models and communicating, by the handheld interactive object, a first message to the remote computing device based at least in part on processing the movement data according to the one or more local machine-learned models. And, the method includes, in response to selecting the one or more remote machine-learned models, communicating, by the handheld interactive object, a second message to the remote computing device, the second message including the movement data for processing by the remote computing device according to the one or more remote machine-learned models.

Another aspect of the present disclosure is directed to a handheld interactive object including one or more sensors, one or more processors, one or more communication interfaces, and one or more non-transitory computer-readable media that collectively store instructions that, when executed by the one or more processors, cause the handheld interactive object to perform operations. The operations can include receiving, via the one or more sensors, movement data indicative of a movement of the handheld interactive object. The operations can include selecting one or more local machine-learned models stored by the one or more non-transitory computer readable media or one or more remote machine-learned models stored at a remote computing device communicatively connected to the handheld interactive object for processing the movement data. The one or more local machine-learned models are trained to identify a first subset of gesture actions performed with the handheld interactive object and the one or more remote machine-learned models are trained to identify a second subset of gesture actions performed with the handheld interactive object. The operations can include, in response to selecting the one or more local machine-learned models, processing the movement data according to the one or more local machine-learned models and communicating, via the one or more communication interfaces, one or more first messages to the remote computing device based at least in part on processing the movement data according to the one or more local machine-learned models. And, the operations can include, in response to selecting the one or more remote machine-learned models, communicating, via the one or more communication interfaces, one or more second messages to the remote computing device, the one or more second messages including the movement data for processing by the remote computing device according to the one or more remote machine-learned models.

Yet another aspect of the present disclosure is directed to one or more non-transitory computer-readable media including instructions that when executed by one or more computing devices cause the one or more computing devices to perform operations. The operations can include receiving, via one or more inertial measurement units of a handheld interactive object, movement data indicative of a movement of the handheld interactive object. The operations can include selecting one or more local machine-learned models of the handheld interactive object or one or more remote machine-learned models of a remote computing device communicatively connected to the handheld interactive object for processing the movement data. The one or more local machine-learned models are trained to identify a first subset of gesture actions performed with the handheld interactive object and the one or more remote machine-learned models are trained to identify a second subset of gesture actions performed with the handheld interactive object. The operations can include, in response to selecting the one or more local machine-learned models, processing the movement data according to the one or more local machine-learned models and communicating a first message to the remote computing device based at least in part on processing the movement data according to the one or more local machine-learned models. And, the operations can include, in response to selecting the one or more remote machine-learned models, communicating a second message to the remote computing device, the second message including the movement data for processing by the remote computing device according to the one or more remote machine-learned models.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts an example handheld interactive object ecosystem according to example aspects of the present disclosure;

FIG. 4 depicts example user inputs according to example aspects of the present disclosure;

FIG. 5 depicts an example method for gesture recognition according to example aspects of the present disclosure.

DETAILED DESCRIPTION

Figure 1A:
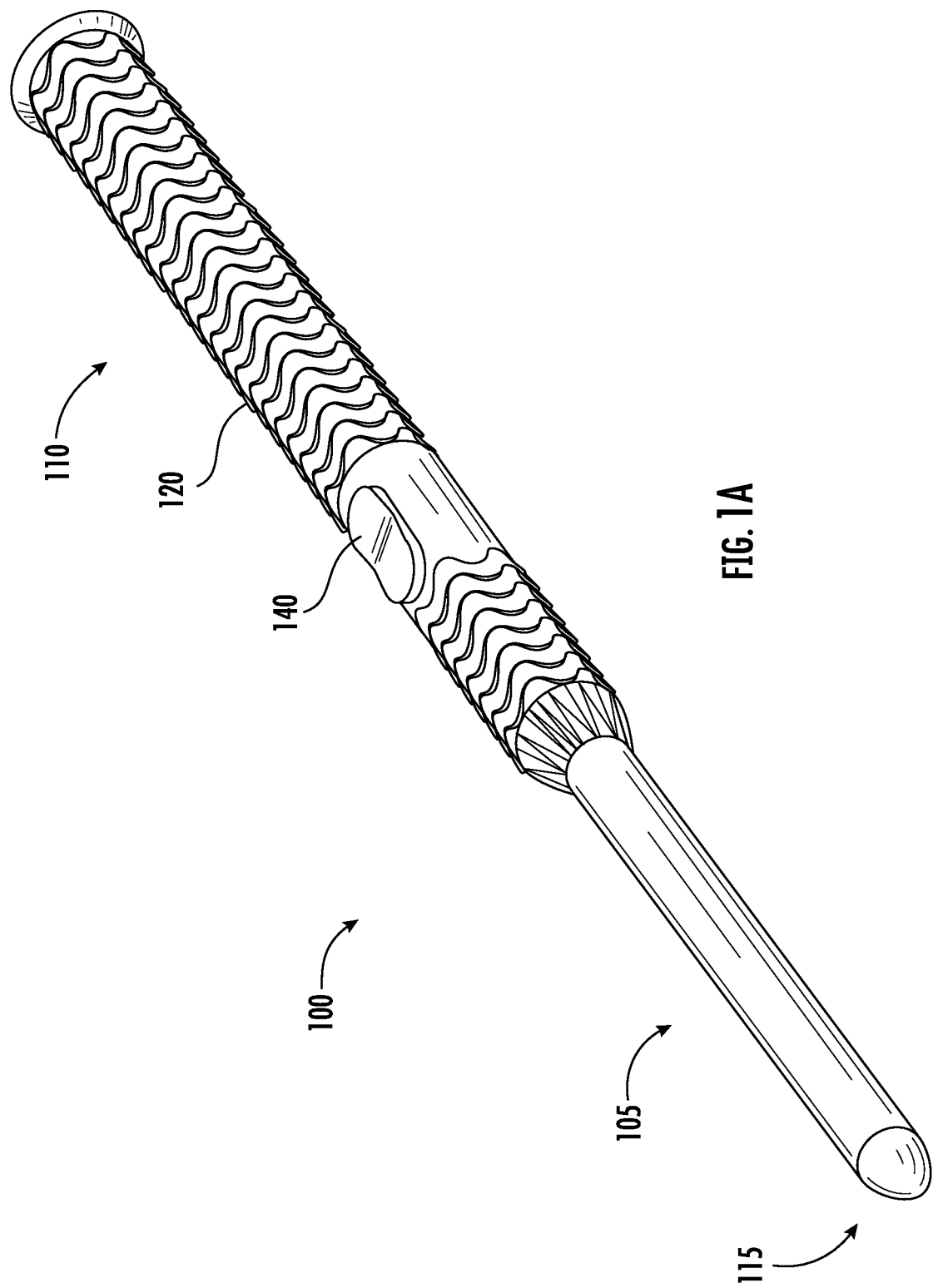
FIGS. 1A-E depict an example handheld interactive object and an example hardware architecture of a handheld interactive object according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improved gesture recognition for handheld electronic devices such as interactive toy wands. For example, a user can hold a handheld interactive object and move the handheld interactive object in one or more recognizable patterns to initiate an action. The handheld interactive object can be, for example, a handheld electronic smart wand with a hardware architecture that enables inter-device communications as well as motion sensing. Gesture-recognition software can allow a user to perform an action (e.g., make a purchase, engage in a collaborative game, etc.) by making a particular gesture with the handheld interactive object (e.g., a spell motion with the electronic smart wand, etc.). The handheld interactive object may be paired with a remote device (e.g., a user's phone, a store's terminal device, a house networking device, etc.) to help extend the functionality of the handheld interactive object by allowing it to leverage the computing resources of the remote device. For example, gesture-recognition software running on the remote device can enable the recognition of complex gestures performed by the handheld interactive object that may not be recognizable by local gesture-recognition software running on the handheld interactive object. In such a case, the handheld interactive object can receive movement information representing a gesture performed with the handheld interactive object and communicate the movement information to the remote device for identifying the gesture corresponding to the movement information.

The technology of the present disclosure can improve power and bandwidth usage by handheld interactive objects by selectively recognizing gestures based, at least in part, on the complexity of the gesture or user input. For example, the handheld interactive object can receive movement data representative of a movement of the handheld interactive object. The handheld interactive object can select local gesture-recognition software (e.g., one or more locally stored machine-learned models) or remote gesture-recognition software (e.g., one or more machine-learned models stored at a remote computing device) for processing the movement data. The handheld interactive object can select the processing software based on the complexity of the gesture and/or user input data (e.g., an activation of a button, a preceding movement of the handheld interactive object, an auditory command, etc.). Once selected, the handheld interactive object can communicate one or more message(s) to a paired remote computing device (e.g., a home network device, a mobile phone, a store network device, etc.) based on the selected gesture recognition software. For instance, in response to selecting the local gesture recognition software, the handheld interactive object can communicate first message(s) including data identifying a recognized gesture corresponding the movement data, whereas in response to selecting the remote gesture recognition software, the handheld interactive object can communicate second message(s) including at least a portion of the movement data for processing by the remote gesture recognition software. In this way, the technology of the present disclosure decreases power consumption and bandwidth usage of a handheld interactive object, while allowing the recognition of complex gestures performed by the handheld interactive object.

More particularly, a handheld interactive object can be a handheld electronic device that includes various hardware components. For instance, the handheld interactive object can include a wand-like form factor. The wand-like form factor can include a generally cylindrical outer casing with a first end (e.g., including a wand tip, etc.) and a second end (e.g., including a wand handle, etc.). The generally cylindrical outer casing can include various diameters such that, for example, it is tapered from the second end to the first end. In some implementations, the handheld interactive object may include another type of form-factor such as, for example, a spherical form-factor.

The outer casing of the handheld interactive object can form a cavity, which can include various hardware components for performing the functions of the handheld interactive object. As an example, the handheld interactive object can include hardware components such as one or more sensors, etc. that enable the handheld interactive object to detect a movement of the handheld interactive object. The sensor(s) can include an inertial measurement unit (e.g., accelerometer, gyroscope, etc.), haptic actuator (e.g., eccentric rotating mass (ERM) motor, etc.), and/or any other device capable of detecting a relative movement of an object. In addition, the hardware components can include, for example: input sensors/devices (e.g., inductive sensor, interactive buttons, etc.) for detecting user input, communication interface(s) (e.g., Bluetooth chip, antenna, etc.) for communicating with remote devices, microcontroller, power source (e.g., battery with associated charging hardware, etc.), output device(s) (e.g., LED/other lights, speakers, etc.), processor(s), memory, and/or other components. The hardware architecture of the handheld interactive object can allow it to perform various functions including, for example, making/recognizing gesture(s) and communicating with remote device(s), as further described herein.

For example, the handheld interactive object can include one or more memories. The one or more memories can store, at least in part, one or more non-transitory computer-readable media that collectively store instructions that, when executed by the one or more processors, cause the handheld interactive object to perform operations. In some implementations, the memories can include local gesture recognition software stored therein. For example, the handheld interactive object can include one or more local machine-learned models stored by the one or more non-transitory computer readable media. The local machine-learned model(s) can be trained to identify a first subset of gesture actions performed with the handheld interactive object.

By way of example, the local machine-learned model(s) can be trained to identify a gesture action corresponding to movement data representative of a gesture performed with the handheld interactive object. The local machine-learned model(s) can include neural networks, non-linear models, linear models, and/or any other machine-learned model capable of recognizing movement patterns of an object. The local machine-learned model(s) can be learned using one or more machine-learning techniques (e.g., backpropagation, supervised learning techniques, unsupervised learning techniques, etc.) to identify the first subset of gesture actions performed with the handheld interactive object. The first subset of gesture actions, for example, can include a subset of a plurality of recognizable gestures that can be performed with the handheld interactive object. In some implementations, the first subset of gesture actions can include one or more simple gesture actions.

The handheld interactive device can be communicatively connected to a remote computing device such as, for example, a mobile phone, a home networking device, a store networking device, and/or any other device capable of wireless communication. For example, the handheld interactive object can be wirelessly connected (e.g., paired) to a remote computing device over one or more communication channels. As an example, the handheld interactive object and the remote computing device can be paired over one or more radio frequencies such as via a Bluetooth connection. Once paired, the handheld interactive object can leverage the computing resources of the remote computing device to perform one or more functions such as, for example, complex gesture recognition.

For instance, the remote computing device can include remote gesture recognition software. The remote gesture recognition software can include one or more remote machine-learned models that are trained to identify a second subset of gesture actions performed with the handheld interactive object. By way of example, the remote machine-learned model(s) can be trained to identify a gesture action corresponding to movement data received from the handheld interactive object. The remote machine-learned model(s) can include neural networks, non-linear models, linear models, and/or any other machine-learned model capable of recognizing movement patterns of a handheld interactive object. The remote machine-learned model(s) can be learned, using one or more machine-learning techniques (e.g., backpropagation, supervised learning techniques, unsupervised learning techniques, etc.), to identify the second subset of gesture actions performed with the handheld interactive object. The second subset of gesture actions, for example, can include a different subset (e.g., from the first subset of gesture actions) of a plurality of recognizable gestures that can be performed with the handheld interactive object. For instance, the first subset of gesture actions can be exclusive of the second subset of gesture actions. In some implementations, the second subset of gesture actions can include one or more complex gesture actions. In some examples, the remote computing device can also be configured to detect one or more of the first subset of gesture actions using one or more machine-learned models.

The handheld interactive object can receive movement data from one or more sensors (e.g., IMU) and identify a corresponding gesture action using at least one of the gesture recognition software (e.g., locally via the local gesture recognition software, remotely using the remote gesture recognition software). For instance, the user can physically move the handheld interactive object(s) to perform a particular gesture. The gesture can correspond to a gesture action recognizable by at least one of the gesture recognition software. The movement data can be input to the at least one gesture recognition software to receive the gesture action as an output from the at least one gesture recognition software. The gesture action can represent a simple gesture such as one or more tap gestures, swipe gestures, pointing gestures, picking up/laying down gestures, preparing for use gestures, etc. or one or more complex gestures including one or more complex movement patterns such as a spell-like motion associated with a wand, a drawing motion, writing motion, etc.

More particularly, while in motion, the handheld interactive object(s) can receive movement data (e.g., via one or more sensors such as the IMU(s), etc.) indicative of the movement of the handheld interactive object(s). The movement data, for example, can include one or more of velocity, acceleration, or positional information of the handheld interactive object. Such information can be indicative of a movement pattern of the handheld interactive object over a time period (e.g., a reception time period). By way of example, the movement data can indicate the position(s) and time(s) associated with the motion of the handheld interactive object(s). This data can be expressed as a series of coordinate point(s) (e.g., 2D x-y coordinates, etc.) and time(s) (e.g., time durations from a to, timestamps associated with a world clock, etc.).

The handheld interactive object(s) can provide the movement data (e.g., the coordinates/times associated with a movement of the handheld interactive object, etc.) to the gesture recognition software (e.g., locally, or remotely). The gesture recognition software can be configured to analyze the coordinates/times to identify the particular gesture performed with the handheld interactive object. For example, the movement data input into the gesture recognition software can be indicative of three-dimensional motion data generated by the handheld interactive object (e.g., X-Y-Z coordinate data, with associated times, etc.). The gesture recognition software can be configured to flatten the three-dimensional coordinates into a two-dimensional representation (e.g., by viewing the sequence via a common view plane, etc.). The two-dimensional representation can then be matched to a stored gesture in one or more motion libraries (e.g., to identify a particular gesture within a particular confidence range, etc.) to determine a gesture action intended by the user. The gesture recognition software can output data indicative of the identified gesture action.

The handheld interactive object and/or the remote computing device can perform one or more actions based at least in part on the gesture action. By way of example, the handheld interactive object can turn on light, output an auditory signal, etc. in response to one or more gesture actions. In addition, or alternatively, the remote computing device can initiate an action associated with a collaborative game, adjust an auditory output, initiate an online purchase via an e-commerce application, activate a lighting source, capture an image, initiate a communication (e.g., phone call, telephone call, etc.), emit a sound, and/or any other action relevant to the remote computing device.

In order to conserve computing resources (e.g., bandwidth, power, etc.), the handheld interactive object can be configured to selectively process the movement data to determine a gesture action locally or remote from the handheld interactive object. For example, the handheld interactive object can select one or more of the local machine-learned models of the handheld interactive object and/or one or more of the remote machine-learned model(s) of the remote computing device communicatively connected to the handheld interactive object for processing the movement data.

The handheld interactive object can communicate one or more messages to the remote computing device based, at least in part, on the selected machine-learned model(s). As one example, in some implementations, the handheld interactive object can select the local machine-learned model(s). In response to selecting the local machine-learned models, the handheld interactive object can process the movement data according to the local machine-learned model(s) and communicate one or more first message(s) to the remote computing device based at least in part on processing the movement data according to the local machine-learned model(s). The first message(s), for example, can include an indication of a gesture action output by the local machine-learned model(s). In this manner, the handheld interactive object can notify the remote computing device of a gesture performed with the handheld interactive object without transmitting expensive motion data across a wireless connection.

In addition, or alternatively, the handheld interactive object can select the remote machine-learned model(s). In response to selecting the remote machine-learned model(s), the handheld interactive object can communicate one or more second message(s) to the remote computing device. The second message(s), for example, can include at least a portion of the movement data for processing by the remote computing device according to the one or more remote machine-learned models. In this manner, the remote computing device can identify a gesture performed by the handheld interactive object based, at least in part, on the movement data representing the gesture.

In some implementations, the handheld interactive object can select the local machine-learned model(s) and process the movement data based, at least in part, on an output of the local machine-learned model(s). For example, the handheld interactive object can compare the output of the local machine-learned model(s) to the first subset of gesture actions. In response to a positive identification of at least one of the first subset of gesture actions, the handheld interactive object can communicate at least one first message to the remote computing device including data indicative of the at least one of the first subset of gesture actions. In response to a negative identification of at least one of the first subset of gesture actions, the handheld interactive object can communicate at least one second message to the remote computing device including at least a portion of the movement data for processing by the remote computing device according to the one or more remote machine-learned models. In this manner, the movement data can first be input to the local machine-learned models for detection of the first subset of gesture actions and, if no gesture is detected locally, the movement data can be transmitted to the remote computing device.

In some implementations, the handheld interactive object can select a machine-learned model for processing the movement data based, at least in part, on user input data. For example, the handheld interactive object can receive user input data via one or more input devices (e.g., interactive button(s), IMU(s), etc.) of the handheld interactive object. For instance, the handheld interactive object can detect user input provided by a user of the handheld interactive object. The user input can include a physical contact (e.g., a touch input, squeezing action, etc.) with the handheld interactive object (and/or input device thereof), a movement (e.g., an initial gesture, a particular movement pattern, etc.) of the handheld interactive object, an audio input (e.g., a voice command, etc.) to the handheld interactive object, etc. As an example, the one or more input devices can include one or more interactive buttons (e.g., along a wand handle of an interactive toy wand). In such a case, the user input data can be indicative of an activation of at least one of the interactive button(s). As another example, the one or more input devices can include one or more motion sensors such as the one or more inertial measurement units. In such a case, the user input data can include an initial movement of the handheld interactive object before the detection of the movement data.

For example, the movement data can be associated with a reception time period indicative of a time during which the movement data is received. The handheld interactive object can receive, via the one or more input devices, user input data associated with the reception time period. The handheld interactive object can select the local machine-learned model(s) and/or the one or more remote machine-learned model(s) based, at least in part, on the user input data associated with the reception time period.

By way of example, in response to user input data received before the reception time period, the handheld interactive object can automatically generate at least one of the one or more second messages and communicate the at least one second message to the remote computing device. The at least one second message can include data indicative of at least a portion of the movement data. In this manner, a user can indicate (e.g., in anticipation of a complex movement of the interactive object) that the movement data should be provided to the remote computing device. In some implementations, the user input data can be indicative of the activation of the at least one interactive button at least partially during the reception time period. In such a case, the at least one second message can be communicated to the remote computing device during and/or subsequent to the reception time period based, at least in part, on the activation of the at least one interactive button. In this manner, movement data received while the at least one interactive button is activated can be automatically provided to the remote computing device for processing.

As another example, the handheld interactive object can receive initial movement data indicative of an initial movement of the handheld interactive object before the reception time period. The initial movement data, for example, can include at least one simple gesture action of the first subset of gesture actions. The simple gesture action can be indicative of an upcoming complex gesture action. In such a case, the handheld interactive object can identify, via the one or more local machine-learned models, the simple gesture action corresponding to the initial movement data and, in response to the simple gesture action, select the remote machine-learned model(s) for processing the movement data recorded during the reception time period. In this manner, a user can identify an upcoming complex action, via a simple gesture action, before the complex action is performed.

The present disclosure provides a number of technical effects and benefits. For example, the disclosed technology can leverage multiple machine-learned models distributed across handheld interactive object(s) and remote computing device(s) to efficiently coordinate the recognition of gestures performed with the interactive object(s). In doing so, the present disclosure can enable handheld interactive object(s), with limited processing capabilities due to size constraints, to recognize sophisticated gestures without undue bandwidth usage. For instance, by recognizing simple gestures locally, the disclosed technology can help save computational resources (e.g., processing, memory, power, bandwidth, etc.) that would otherwise be wasted by transmitting expensive movement data across network channels according to conventional techniques. In this way, the disclosed technology provides a practical improvement to handheld devices generally and, more particularly, to the recognition of gestures made with handheld devices. Ultimately, the technology of the present disclosure provides effective and computationally efficient gesture recognition processes, systems, and devices.

FIGS. 1A-E depict an example handheld interactive object and an example hardware architecture of a handheld interactive object according to example aspects of the present disclosure. For example, FIG. 1A depicts an example handheld interactive object 100. The handheld interactive object 100 can be a hand-held electronic device. The handheld interactive object 100 can be an interactive toy (e.g., an electronic smart wand toy, etc.). For instance, the handheld interactive object 100 can include a wand-like form factor. The wand-like form factor can include a generally cylindrical shape. In some implementations, the wand-like form factor of the handheld interactive object 100 can include one or more other shapes (e.g., square, rectangular, hexagonal, octagonal, etc.). In some implementations, the handheld interactive object 100 may include another type of form-factor such as, for example, a spherical form-factor. A handheld interactive object 100 can include any device having one or more processors and at least one sensor. For example, a handheld interactive object 100 may include a tablet computing device, smartphone, portable media player, etc. The handheld interactive object 100 (and its portions/elements) can be constructed from one or more materials including, for example, polymers, metal, wood, composites, and/or one or more other materials.

The handheld interactive object 100 can include a plurality of portions. For example, the handheld interactive object 100 can include a first end/portion 105 and a second end/portion 110. The first end/portion 105 can include, for example, a tip 115 (e.g., of the wand, etc.). The second end/portion 110 can include a handle 120 (e.g., a wand handle, etc.). In some implementations, the handle 120 can include a material suitable for securing or comforting the grip of a user (e.g., rubber, polymer, ridged surface, padding, etc.).

Figure 1B:
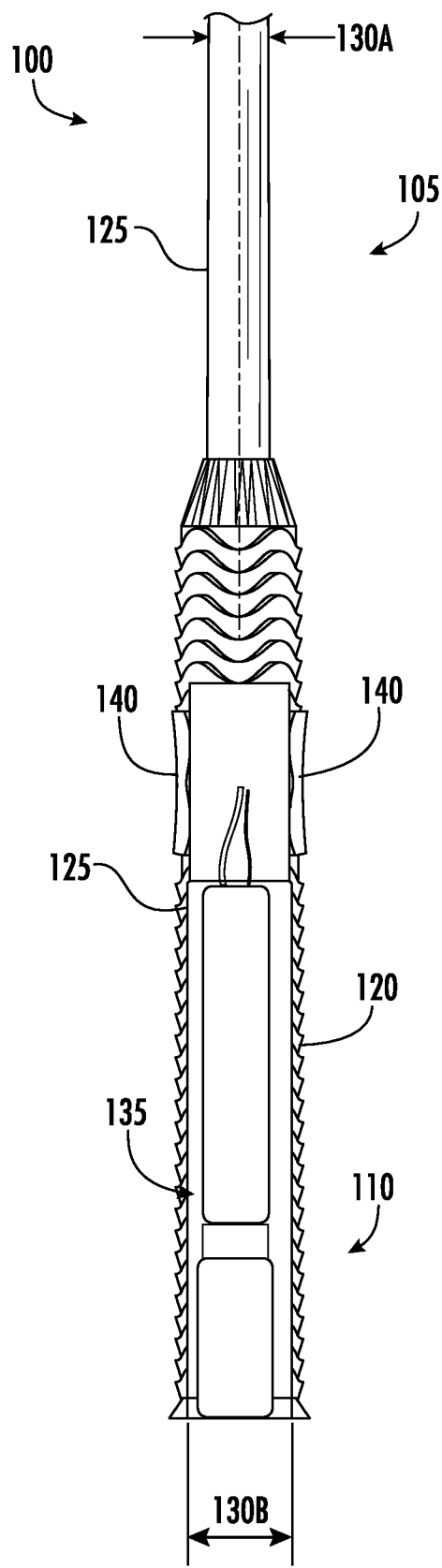

With reference to FIG. 1B, the handheld interactive object 100 can include an outer casing 125 (e.g., an outer shell, layer, etc.) with an outer surface. In some implementations, at least a portion of the outer casing 125 can be covered by another material. This can include, for example, a grip/comfort material of the handle 120. The outer casing 125 can include one or more diameters/widths 130A-B. For example, the first end/portion 105 can be associated with one or more first diameters 130A (e.g., 15 mm, etc.). The second end/portion 110 can be associated with one or more second diameters 130B. The first diameter(s) 130A can be smaller than the second diameter(s) 130B. This can allow, for example, the handheld interactive object 100 to appear tapered from the second end 110 to the first end 105.

In some implementations, the handheld interactive object 100 can include one or more devices for obtaining user input (e.g., such as interactive button 140). For instance, the handheld interactive object 100 can include a user input sensor 135 on the interactive object. The user input sensor 135 can be disposed proximate to the second end 110 (e.g., closer to the second end 110 than the first end 105, etc.). For example, the user input sensor 135 can be disposed within a cavity formed by the outer casing 125 and within/under the handle 120. The user input sensor 135 can include an inductive sensor. The inductive sensor can include a coil with a metal casing surrounding the coil. The coil can be configured to detect a change in a magnetic field arising from a deformation of the metal casing. Such a deformation can be caused, for example, by a user input (e.g., a user physically gripping the handle 120 of the handheld interactive object 100, etc.). Additionally, or alternatively, the handheld interactive object 100 can include one or more interactive elements 140. This can include, for example, one or more buttons, touchpads, and/or other features that a user can physically contact to provide user input.

Figure 1C:
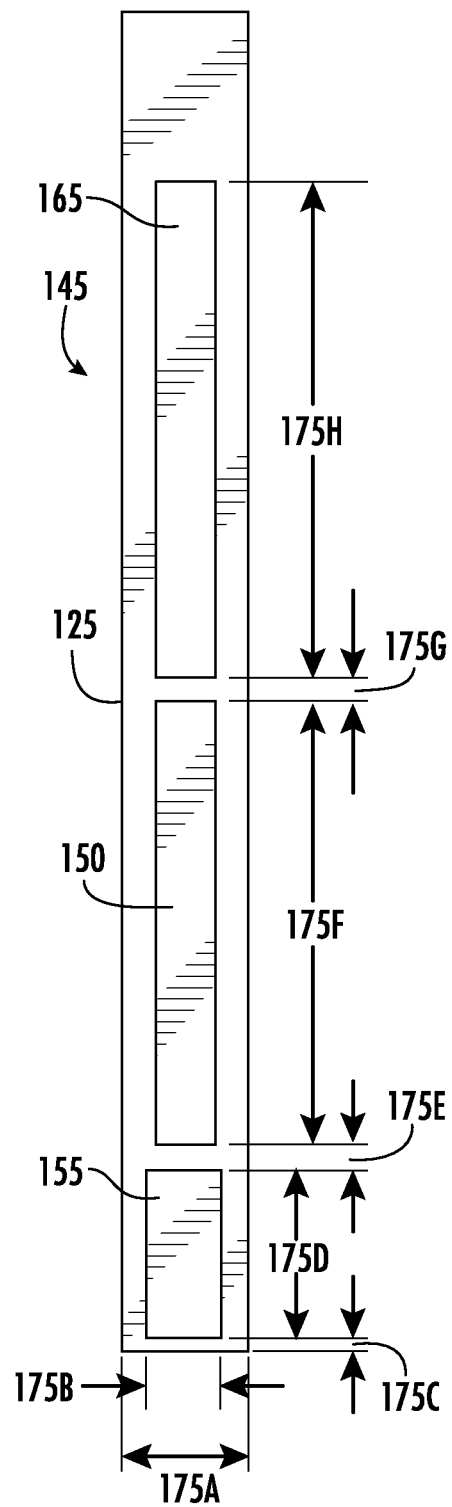
Figure 1D:
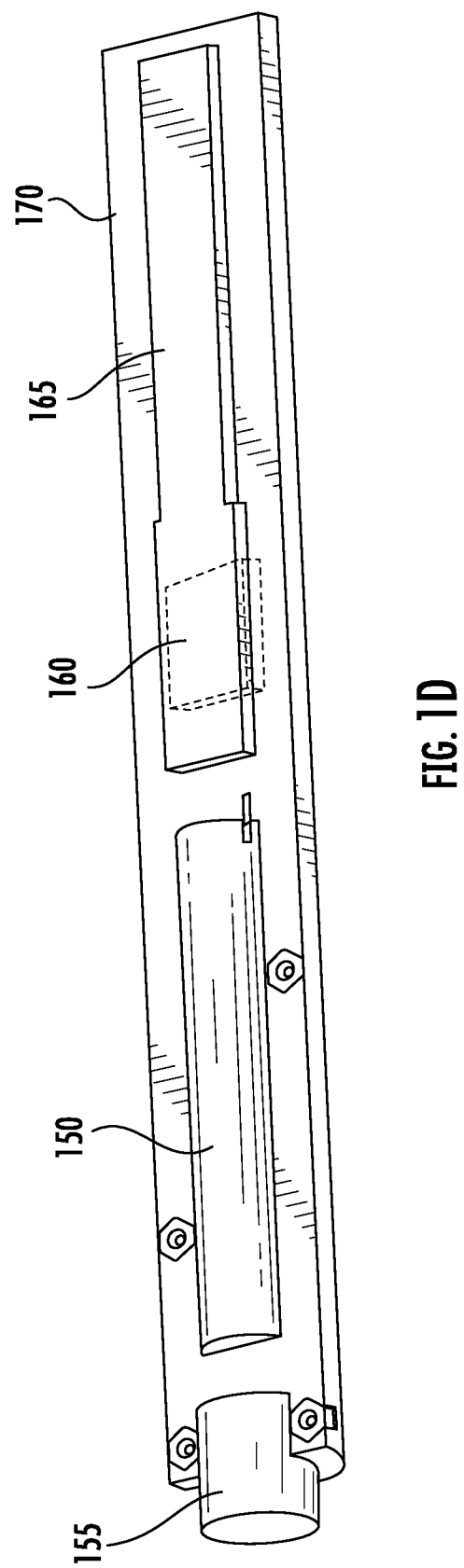

With reference to FIGS. 1C and 1D, the handheld interactive object 100 can include a cavity 145. As described herein, the cavity 145 can be an interior cavity of the handheld interactive object 100 formed by the outer casing 125. Various hardware components for performing the functions of the handheld interactive object 100 can be disposed within the cavity 145. The handheld interactive object 100 can include a power source 150 with an associated charging/fueling infrastructure 155. For example, the power source 150 can include one or more batteries (e.g., lithium-ion batteries, lithium-ion polymer batteries, and/or other batteries) and the charging/fueling infrastructure 155 can include wired and/or wireless (e.g., inductive, etc.) charging hardware. In some implementations, the interactive object 100 can include a haptic actuator 160 (shown in FIG. 1D) and a printed circuit board 165. The haptic actuator 160 can be configured to provide haptic feedback (e.g., vibration, etc.) to a user of the handheld interactive object 100. As shown in FIG. 1D, various hardware components can be secured to/within the interactive object 100 via a support structure 170. The support structure 170 can include a mechanical spine or other structural element to which the various hardware components can be affixed. The support structure 170 can be affixed to the outer casing 125 (e.g., an interior surface thereof, etc.). In some implementations, the support structure 170 can be temporarily affixed so that it can be removed for maintenance, replacement, update, etc. of the various hardware components.

As shown in FIG. 1C, the cavity 145 and the various hardware components can include various dimensions 175A-H. For example, the cavity 145 can include a width with a first dimension 175A (e.g., 2-25 mm, etc.). This can represent the distance from one side of the interior surface of the outer casing 125 to another. The charging/fueling infrastructure 155 can include a width with a second dimension 175B (e.g., 3-15 mm, etc.), can be spaced from an end of the cavity 145 by a third dimension 175C (e.g., 0.5-3 mm, etc.), and can have a length of a fourth dimension 175D (e.g., 10-30 mm, etc.). The power source 150 can be spaced apart from the charging/fueling infrastructure by a fifth dimension 175E (e.g., 0.5-7 mm, etc.) and have a length of a sixth dimension 175F (e.g., 30-70 mm, etc.). The support structure 165 can be spaced apart from the power source 150 by a sixth dimension 175G (e.g., 0.5-7 mm, etc.) and have a length of a seventh dimension 175H (e.g., 30-70 mm, etc.).

Figure 1E:
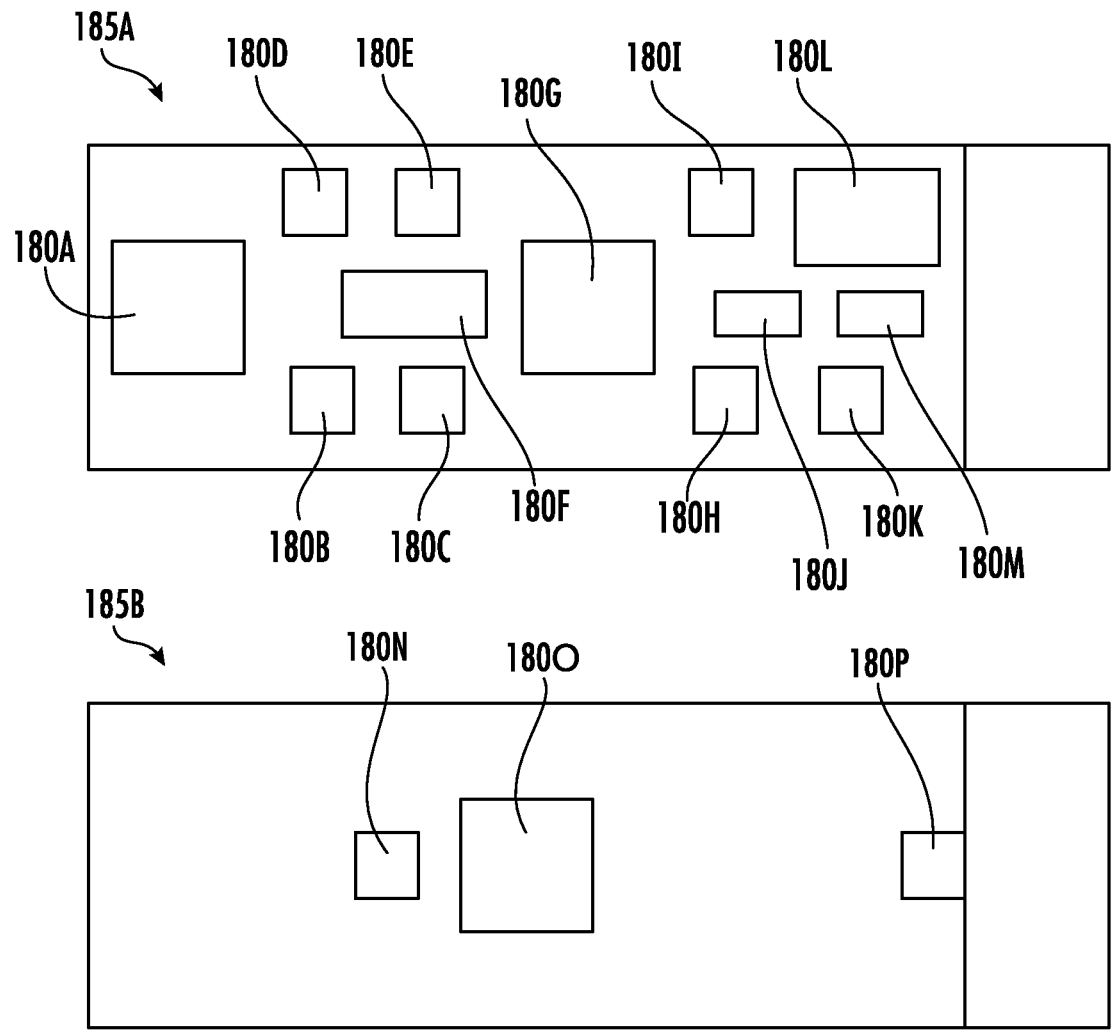

FIG. 1E depicts another diagram of example hardware components 180A-P that can be included in the handheld interactive object 100. The hardware components 180A-P can be disposed across various layers 185A-B (e.g., top layer, bottom layer, etc.). As an example, the handheld interactive object 100 can include one or more sensors, etc. that enable the handheld interactive object 100 to detect a movement of the handheld interactive object. The sensor(s) can include an inertial measurement unit 180H (e.g., accelerometer, gyroscope, etc.) and/or any other device capable of detecting a relative movement of an object.

In addition, the hardware component(s) 180A-P can include, for example: charging/fueling infrastructure 180A (e.g., as described herein, etc.); device(s) 180B/K for detecting user input (e.g., inductive sensor, interactive button(s), etc.); one or more output device(s) 180C (e.g., LED/other lights, speakers, etc.) and associated hardware 180P (e.g., connector(s), etc.); a gauge 180D configured to indicate a level of power of the interactive device 100 (e.g., a battery for wired or wireless charging, etc.); power management integrated circuit(s) 180E configured to manage the power of the interactive device 100; a power source 180F (e.g., as described herein, etc.); microcontroller(s) 180G; haptic actuator 180I (e.g., eccentric rotating mass (ERM) motor, etc.) and associated actuator hardware 180N (e.g., connector(s), etc.); memory 180J (e.g., non-volatile memory chip, flash memory, etc.); a communication interface 180K (e.g., antenna, etc.) and associated computing hardware 180L (e.g., BLE chip, etc.); processor(s) 180O; infrared sensors 180M (e.g., infrared receiver(s), transmitter(s), etc.) and/or other components. In some implementations, the output device(s) 180C can be configured to output signals from the first end 105 (e.g., the tip 115, etc.) of the interactive object 100.

The hardware architecture/components can allow the handheld interactive object 100 to identify one or more gestures performed with the handheld interactive object 100. For example, the handheld interactive object 100 can include one or more memories 180J. The one or more memories 180J can store, at least in part, one or more non-transitory computer-readable media that collectively store instructions that, when executed by the one or more processors, cause the handheld interactive object 100 to perform operations. In some implementations, the memories 180J can include local gesture recognition software stored therein. For example, the handheld interactive object 100 can include one or more local machine-learned models stored by the one or more non-transitory computer readable media. The local machine-learned model(s) can be trained to identify a first subset of gesture actions performed with the handheld interactive object 100.

By way of example, the local machine-learned model(s) can be trained to identify a gesture action corresponding to movement data representative of a gesture performed with the handheld interactive object 100. The local machine-learned model(s) can include neural networks, non-linear models, linear models, and/or any other machine-learned model capable of recognizing movement patterns of an object. The local machine-learned model(s) can be learned using one or more machine-learning techniques (e.g., backpropagation, supervised learning techniques, unsupervised learning techniques, etc.) to identify the first subset of gesture actions performed with the handheld interactive object 100. The first subset of gesture actions, for example, can include a subset of a plurality of recognizable gestures that can be performed with the handheld interactive object. In some implementations, the first subset of gesture actions can include one or more simple gesture actions.

In addition, or alternatively, the hardware architecture/components can allow the handheld interactive object 100 to pair with another electronic device and/or facilitate the pairing between two objects. FIG. 2 depicts an example interactive object ecosystem 200 according to example aspects of the present disclosure. As illustrated, an interactive object ecosystem 200 can include a handheld interactive object 205 and a remote computing device 210. The handheld interactive object 205 can include the interactive object 100 described with reference to FIG. 1. The handheld interactive object 205 can be communicatively connected to the remote computing device 210. For example, the remote computing device 210 can include a mobile phone, a home networking device, a store networking device, and/or any other device capable of wireless communication. The handheld interactive object 205 can be wirelessly connected (e.g., paired) to the remote computing device 210 over one or more communication channels. As an example, the handheld interactive object 205 and the remote computing device 210 be paired over one or more radio frequencies such as via a Bluetooth connection. Once paired, the handheld interactive object 205 can leverage the computing resources of the remote computing device 210 to perform one or more functions such as, for example, complex gesture recognition.

For instance, the remote computing device 210 can include remote gesture recognition software. The remote gesture recognition software can include one or more remote machine-learned models that are trained to identify a second subset of gesture actions performed with the handheld interactive object 205. By way of example, the remote machine-learned model(s) can be trained to identify a gesture action corresponding to movement data received from the handheld interactive object 205. The remote machine-learned model(s) can include neural networks, non-linear models, linear models, and/or any other machine-learned model capable of recognizing movement patterns of a handheld interactive object 205. The remote machine-learned model(s) can be learned, using one or more machine-learning techniques (e.g., backpropagation, supervised learning techniques, unsupervised learning techniques, etc.), to identify the second subset of gesture actions performed with the handheld interactive object 205. The second subset of gesture actions, for example, can include a different subset (e.g., from the first subset of gesture actions) of a plurality of recognizable gestures that can be performed with the handheld interactive object 205. For instance, the first subset of gesture actions can be exclusive of the second subset of gesture actions. In some implementations, the second subset of gesture actions can include one or more complex gesture actions.

The handheld interactive object 205 can receive movement data from one or more sensors (e.g., IMU, etc.) and identify a corresponding gesture action using at least one of the gesture recognition software (e.g., locally via the local gesture recognition software, remotely using the remote gesture recognition software). For instance, the user can physically move the handheld interactive object 205 to perform a particular gesture 215. The gesture 215 can correspond to a gesture action recognizable by at least one of the gesture recognition software. The movement data can be input to the at least one gesture recognition software to receive the gesture action as an output from the at least one gesture recognition software.

Figure 3B:
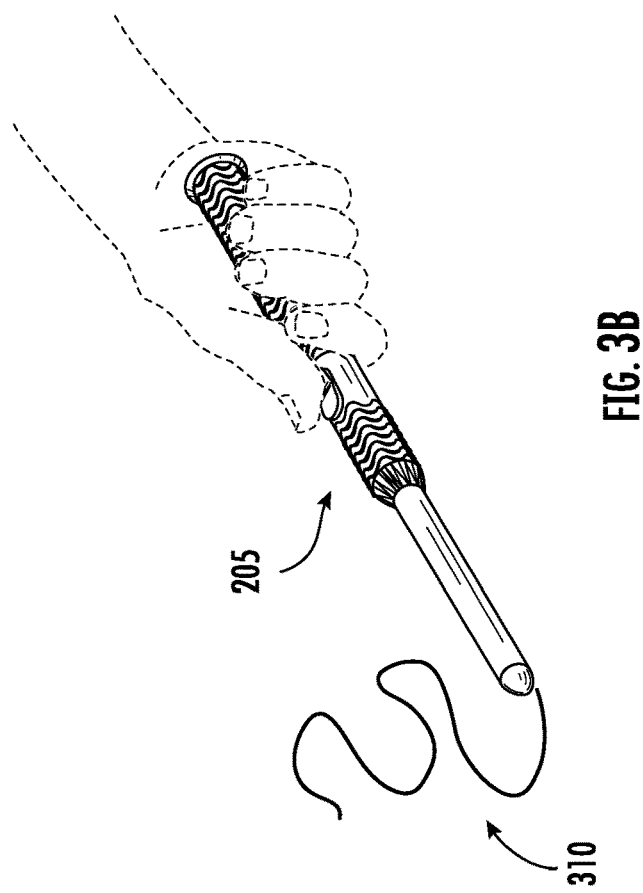
FIGS. 3A-B depict example gesture actions according to example aspects of the present disclosure.
Figure 3A:
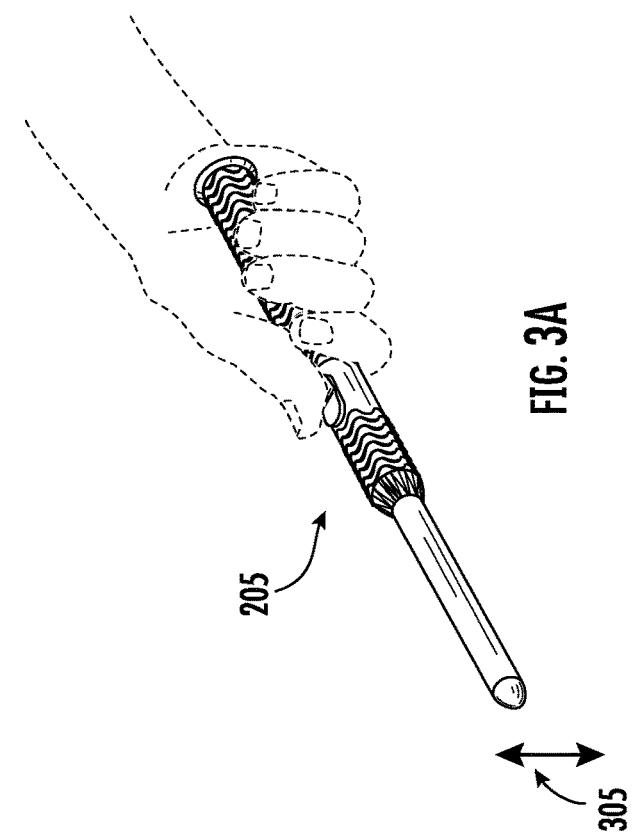

The gesture action can represent a simple gesture and/or a complex gesture. By way of example, FIGS. 3A and 3B depict example gestures 305, 310 according to example aspects of the present disclosure. In particular, FIG. 3A depicts a simple gesture 305. The simple gesture 305 can include one or more gestures such as one or more tap gestures, swipe gestures, pointing gestures, picking up/laying down gestures, preparing for use gestures, etc. For example, the simple gesture 305 can include a tapping gesture. The simple gesture 305 can correspond to a recognizable gesture action such that the handheld interactive object 205 can receive movement data descriptive of the gesture 305 and identify a gesture action (e.g., a tapping gesture action) based, at least in part, on the movement data. As another example, FIG. 3B depicts a complex gesture 310. The complex gesture 310 can include one or more complex movement patterns such as a spell-like motion associated with a wand, a drawing motion, writing motion, etc. For example, the complex gesture 310 can include a spell-like motion. The complex gesture 310 can correspond to a recognizable gesture action such that the handheld interactive object 205 can receive movement data descriptive of the gesture 310 and identify a gesture action (e.g., an action assigned to a particular spell) based, at least in part, on the movement data.

More particularly, with reference to FIG. 2, while in motion, the handheld interactive object 205 can receive movement data (e.g., via one or more sensors such as the IMU(s), etc.) indicative of the movement of the handheld interactive object 205. The movement data, for example, can include one or more of velocity, acceleration, or positional information of the handheld interactive object 205. Such information can be indicative of a movement pattern of the handheld interactive object 205 over a time period (e.g., a reception time period). By way of example, the movement data can indicate the position(s) and time(s) associated with the motion of the handheld interactive object 205. This data can be expressed as a series of coordinate point(s) (e.g., 2D x-y coordinates, etc.) and time(s) (e.g., time durations from a to, timestamps associated with a world clock, etc.).

The handheld interactive object 205 can provide the movement data (e.g., the coordinates/times associated with a movement of the handheld interactive object 205, etc.) to gesture recognition software (e.g., locally, or remotely). The gesture recognition software can be configured to analyze the coordinates/times to identify the particular gesture (e.g., a simple gesture 305, complex gesture 310, etc.) performed with the handheld interactive object 205. For example, the movement data input into the gesture recognition software can be indicative of three-dimensional motion data generated by the handheld interactive object 205 (e.g., X-Y-Z coordinate data, with associated times, etc.). The gesture recognition software can be configured to flatten the three-dimensional coordinates into a two-dimensional representation (e.g., by viewing the sequence via a common view plane, etc.). The two-dimensional representation can then be matched to a stored gesture in one or more motion libraries (e.g., to identify a particular gesture within a particular confidence range, etc.) to determine a gesture action intended by the user. The gesture recognition software can output data indicative of the identified gesture action.

The handheld interactive object 205 and/or the remote computing device 210 can perform one or more action(s) 220, 225 based at least in part on the gesture action. By way of example, the handheld interactive object 205 can perform action(s) 225 such as turning on a light, outputting an auditory signal, etc. in response to one or more gesture actions. In addition, or alternatively, the remote computing device 210 (e.g., a software application running on the device 210, etc.) can perform action(s) 220 such as initiating an action associated with a collaborative game, adjusting an auditory output, initiating an online purchase via an e-commerce application, activating a lighting source, capturing an image, initiating a communication (e.g., phone call, telephone call, etc.), emitting a sound, displaying information and/or any other action relevant to the remote computing device and/or one or more software or hardware capabilities of the remote computing device.

In order to conserve computing resources (e.g., bandwidth, power, etc.), the handheld interactive object 205 can be configured to selectively process movement data to determine a gesture action locally or remote from the handheld interactive object 205. For example, the handheld interactive object 205 can select one or more of the local machine-learned models of the handheld interactive object 205 and/or one or more of the remote machine-learned model(s) of the remote computing device 210 communicatively connected to the handheld interactive object 205 for processing the movement data.

The handheld interactive object 205 can communicate one or more message(s) 230 to the remote computing device 210 based, at least in part, on the selected machine-learned model(s). As one example, in some implementations, the handheld interactive object 205 can select the local machine-learned model(s). In response to selecting the local machine-learned models, the handheld interactive object 205 can process the movement data according to the local machine-learned model(s) and communicate one or more first message(s) to the remote computing device 210 based at least in part on processing the movement data according to the local machine-learned model(s). The first message(s), for example, can include an indication of a gesture action output by the local machine-learned model(s). In this manner, the handheld interactive object 205 can notify the remote computing device 210 of the gesture 215 performed with the handheld interactive object 205 without transmitting the more bandwidth consumptive motion data across a wireless connection.

In addition, or alternatively, the handheld interactive object 205 can select the remote machine-learned model(s). In response to selecting the remote machine-learned model(s), the handheld interactive object 205 can communicate one or more second message(s) to the remote computing device 210. The second message(s), for example, can include at least a portion of the movement data for processing by the remote computing device 210 according to the one or more remote machine-learned models. In this manner, the remote computing device 210 can identify the gesture 215 performed by the handheld interactive object 205 based, at least in part, on the movement data representing the gesture 215.

In some implementations, the handheld interactive object 205 can select the local machine-learned model(s) and process the movement data based, at least in part, on an output of the local machine-learned model(s). For example, the handheld interactive object 205 can compare the output of the local machine-learned model(s) to the first subset of gesture actions. In response to a positive identification of at least one of the first subset of gesture actions, the handheld interactive object 205 can communicate at least one first message to the remote computing device 210 including data indicative of the at least one of the first subset of gesture actions. In response to a negative identification of at least one of the first subset of gesture actions, the handheld interactive object 205 can communicate at least one second message to the remote computing device 210 including at least a portion of the movement data for processing by the remote computing device 210 according to the one or more remote machine-learned models. In this manner, the movement data can first be input to the local machine-learned models for detection of the first subset of gesture actions and, if no gesture is detected locally, the movement data can be transmitted to the remote computing device 210.

In some implementations, the handheld interactive object 205 can select a machine-learned model for processing the movement data based, at least in part, on user input data. For example, FIG. 4 depicts example user inputs 405, 410 according to example aspects of the present disclosure. The handheld interactive object 205 can receive user input data via one or more input devices (e.g., interactive button(s) 140, IMU(s) 180H, etc.) of the handheld interactive object 205. For instance, the handheld interactive object 205 can detect user input provided by a user of the handheld interactive object 205. The user input can include a physical contact 405 (e.g., a touch input, squeezing action, etc.) with the handheld interactive object 205 (and/or input device 140 thereof), a movement 410 (e.g., an initial gesture, a particular movement pattern, etc.) of the handheld interactive object 205, an audio input (e.g., a voice command, etc.) to the handheld interactive object 205, etc. As an example, the one or more input devices can include one or more interactive buttons 140 (e.g., along a wand handle of an interactive toy wand). In such a case, the user input data can be indicative of an activation 405 of at least one of the interactive button(s) 140. As another example, the one or more input devices can include one or more motion sensors such as the one or more inertial measurement units. In such a case, the user input data can include an initial movement 410 of the handheld interactive object 205 before the detection of the movement data.

For example, the movement data can be associated with a reception time period indicative of a time during which the movement data is received. The handheld interactive object 205 can receive, via the one or more input devices, user input data associated with the reception time period. The handheld interactive object 205 can select the local machine-learned model(s) and/or the one or more remote machine-learned model(s) based, at least in part, on the user input data associated with the reception time period.

By way of example, in response to user input data received before the reception time period, the handheld interactive object 205 can automatically generate at least one of the one or more second messages and communicate the at least one second message to the remote computing device 210. The at least one second message can include data indicative of at least a portion of the movement data. In this manner, a user can indicate (e.g., in anticipation of a complex movement of the handheld interactive object 205) that the movement data should be provided to the remote computing device 210.

For example, in response to detecting the user input data, the handheld interactive object 205 can initiate a listening mode associated with one or more sensors of the handheld interactive object 205. For instance, the listening mode can be associated with one or more motion sensors (e.g., IMU(s) 180H, etc.) of the handheld interactive object 205. During the listening mode, the handheld interactive object 205 can receive, from the sensor(s), movement data indicative of a gesture 215 performed with the handheld interactive object 205. In response, the handheld interactive object 205 can automatically generate at least one second message indicative of the movement data and provide the at least one second message to the remote computing device 210.

The user input data, for example, can be indicative of an activation 405 of the at least one interactive button 140 before the reception time period. As another example, the handheld interactive object 205 can receive initial movement data indicative of an initial movement 410 of the handheld interactive object 205 before the reception time period. The initial movement data, for example, can include at least one simple gesture action of the first subset of gesture actions. The simple gesture action can be indicative of an upcoming complex gesture action. In such a case, the handheld interactive object 205 can identify, via the one or more local machine-learned models, the simple gesture action corresponding to the initial movement data and, in response to the simple gesture action, select the remote machine-learned model(s) (e.g., after entering a listening mode, etc.) for processing the movement data recorded during the reception time period. In this manner, a user can identify an upcoming complex action, via a simple gesture action, before the complex action is performed.

In some implementations, the user input data can be indicative of the activation 405 of the at least one interactive button 140 at least partially during the reception time period. In such a case, the at least one second message can be communicated to the remote computing device 210 during the reception time period based, at least in part, on the activation 405 of the at least one interactive button 140. In this manner, movement data received while the at least one interactive button 140 is activated 405 can be automatically provided to the remote computing device 210 for processing.

FIG. 5 depicts an example method 500 for gesture recognition according to example aspects of the present disclosure. One or more portion(s) of method 500 can be implemented by one or more computing device(s) such as, for example, those shown in FIGS. 1A-E, 2, 3A-3B, 4, and 6. Moreover, one or more portion(s) of the method 500 can be implemented as an algorithm on the hardware components of the device(s) described herein (e.g., as in FIG. 1-4, 6, etc.) to, for example, identify one or more gestures performed by a handheld interactive object. FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (502), the method 500 can include receiving, via one or more sensors of a handheld interactive object, movement data indicative of a movement of the handheld interactive object. For example, a handheld interactive object can receive, via one or more sensors, the movement data indicative of the movement of the handheld interactive object. The handheld interactive object, for example, can include a wand-like form factor. The one or more sensors can include an inertial measurement unit. In addition, or alternatively, the movement data can be one or more of a velocity, an acceleration, or positional information of the handheld interactive object. For instance, the movement data can identify a movement pattern of the handheld interactive object.

At (504), the method 500 can include selecting one or more local machine-learned models of the handheld interactive object or one or more remote machine-learned models of a remote computing device communicatively connected to the handheld interactive object for processing the movement data. For example, the handheld interactive object can select the one or more local machine-learned models of the handheld interactive object or the one or more remote machine-learned models of the remote computing device communicatively connected to the handheld interactive object for processing the movement data. The remote computing device can include a mobile phone. The one or more local machine-learned models can be trained to identify a first subset of gesture actions performed with the handheld interactive object and the one or more remote machine-learned models can be trained to identify a second subset of gesture actions performed with the handheld interactive object. In some implementations, the first subset of gesture actions can be exclusive of the second subset of gesture actions. As an example, the first subset of gesture actions can include one or more simple gesture actions and the second subset of gestures can include one or more complex gesture actions. The one or more simple gestures actions can include one or more of a tap gesture or a swipe gesture. The one or more complex gesture actions can include one or more complex movement patterns.

At (506), the method 500 can include determining whether user input is received. For instance, the method 500 can include receiving, by the handheld interactive object via one or more input devices, user input data associated with a reception time period. For example, the handheld interactive object can receive, via the one or more input devices, the user input data associated with the reception time period. As an example, the movement data can be associated with a reception time period indicative of a time during which the movement data is received. The handheld interactive object can select the one or more local machine-learned models or the one or more remote machine-learned models based, at least in part, on the user input data.

For example, the one or more input devices can include at least one interactive button. The user input data can be indicative of an activation of the at least one interactive button. In some implementations, the user input data can be indicative of the activation of the at least one interactive button at least partially during the reception time period. In addition, or alternatively, the one or more input devices can include one or more inertial measurement units. The handheld interactive object can receive, via the one or more inertial measurement units, initial movement data indicative of an initial movement of the handheld interactive object before the reception time period. The handheld interactive object can identify, via the one or more local machine-learned models, a simple gesture action corresponding to the initial movement data. The simple gesture action can be indicative of an upcoming complex gesture action. In response to the simple gesture action, the handheld interactive object can select the one or more remote machine-learned models for processing the movement data.

At (508), the method 500 can include in response to selecting the one or more local machine-learned models, processing the movement data according to the one or more local machine-learned models and communicating, via one or more communication interfaces, one or more first messages to the remote computing device based at least in part on processing the movement data according to the one or more local machine-learned models. For example, the handheld interactive object can, in response to selecting the one or more local machine-learned models, process the movement data according to the one or more local machine-learned models and communicate the one or more first messages to the remote computing device based at least in part on processing the movement data according to the one or more local machine-learned models. For instance, the handheld interactive object can, in response to a positive identification of at least one of the first subset of gesture actions using the one or more local machine-learned models, communicate at least one first message including data indicative of the at least one of the first subset of gesture actions to the remote computing device. In addition, or alternatively, in response to a negative identification of at least one of the first subset of gesture actions using the one or more local machine-learned models, the handheld interactive object can communicate the first message including the movement data for processing by the remote computing device according to the one or more remote machine-learned models.

At (510), the method 500 can include, in response to selecting the one or more remote machine-learned models, communicating, by the handheld interactive object, a second message to the remote computing device. For example, in response to selecting the one or more remote machine-learned models, the handheld interactive object can communicate one or more second messages to the remote computing device. The one or more second messages can include the movement data for processing by the remote computing device according to the one or more remote machine-learned models. In some implementations, in response to receiving user input data, the handheld interactive object can generate at least one of the one or more second messages. The at least one second message can include data indicative of at least a portion of the movement data. The handheld interactive object can communicate, via the one or more communication interfaces, the at least one second message to the remote computing device.

Figure 6:
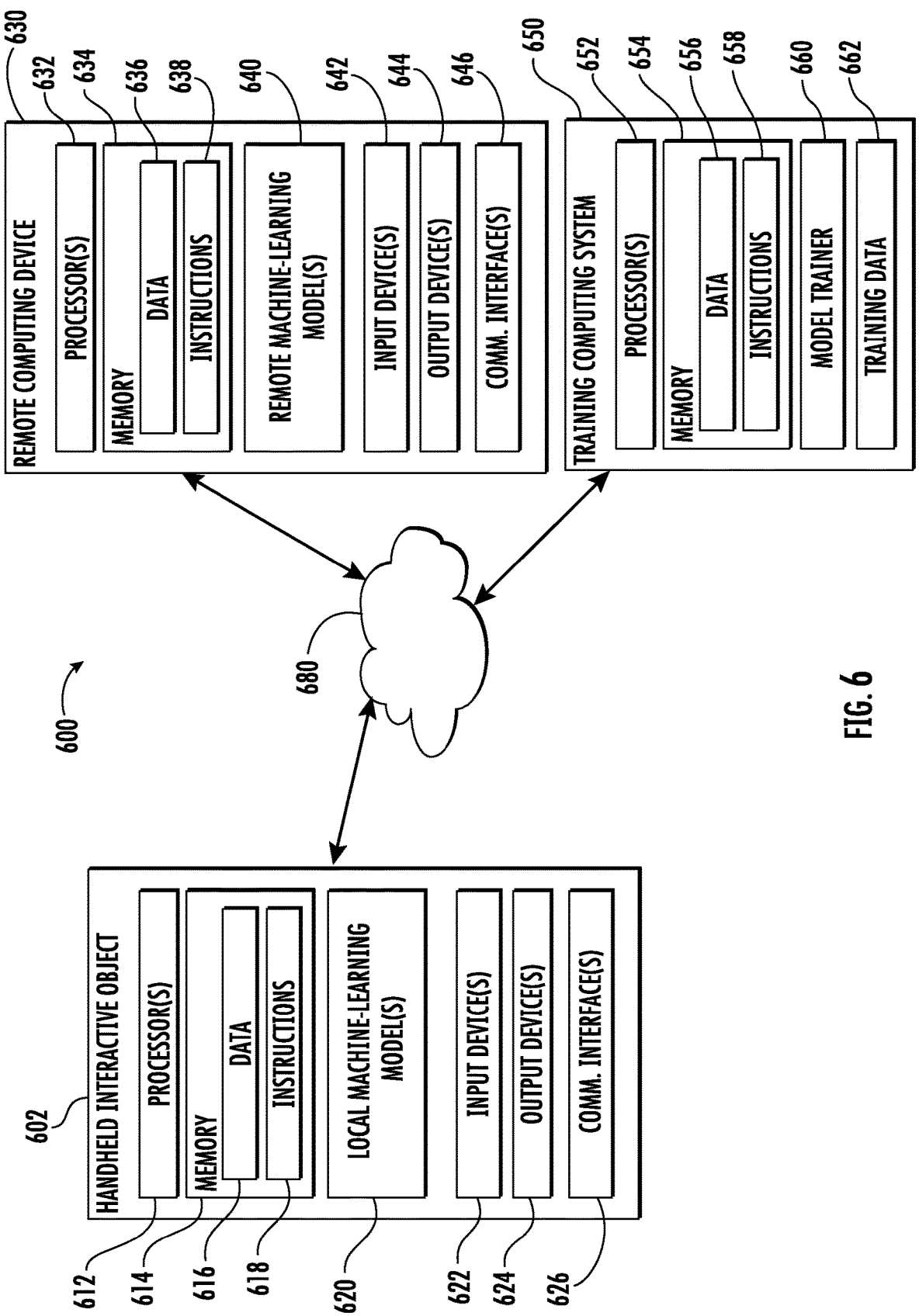
FIG. 6 depicts example components of an example computing system according to example aspects of the present disclosure.

FIG. 6 depicts a block diagram of an example computing system 600 that performs selective gesture recognition according to example aspects of the present disclosure. The system 600 includes a handheld interactive computing object 602 (e.g., handheld interactive computing device 100 of FIGS. 1A-E, handheld interactive computing device 205 of FIGS. 2-4, etc.), a remote computing device 630 (e.g., remote computing device 210 of FIG. 2), and a training computing system 650 that are communicatively coupled over a network 680. By way of example, the handheld interactive object 602 and the remote computing device 630 can communicate via one or more near range communication protocols (e.g., BLE, infrared signals, etc.).

The handheld interactive object 602 includes one or more processors 612 and a memory 614. The one or more processors 612 can be any suitable processing device (e.g., a processor core, a microprocessor, an ASIC, an FPGA, a controller, a microcontroller, etc.) and can be one processor or a plurality of processors that are operatively connected. The memory 614 can include one or more non-transitory computer-readable storage media, such as RAM, ROM, EEPROM, EPROM, flash memory devices, magnetic disks, etc., and combinations thereof. The memory 614 can store data 616 and instructions 618 which are executed by the processor 612 to cause the handheld interactive object 602 to perform operations.

In some implementations, the handheld interactive object 602 can store or include one or more local machine-learning model(s) 620. For example, the local machine-learning model(s) 620 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the local machine-learning model(s) 620 can be stored in the memory 614, and then used or otherwise implemented by the one or more processors 612. More particularly, the local machine-learning model(s) 620 can receive movement data as input and analyze the movement data to identify a gesture action corresponding to the movement data. The local machine-learning model(s) 620 can output the corresponding gesture action in response to the movement data. In some implementations, the local machine-learning model(s) 620 can be configured to identify at least one gesture action of a first subset of gesture actions.

Additionally, or alternatively, one or more remote machine-learning model(s) 640 can be included in or otherwise stored and implemented by the remote computing device 630 that communicates with the handheld interactive object 602 over network 680. The handheld interactive object 602 can include one or more input devices(s) 622 and/or one or more output devices(s) 624. The input devices(s) 622 can include, for example, hardware and/or software for receiving information from a user (e.g., user input data) and/or another device. This can include, for example, one or more sensors (e.g., infrared receivers, inductive sensors, IMUs, etc.), buttons, touch screen/pad, data entry keys, a microphone suitable for voice recognition, etc. The output device(s) 624 can include hardware and/or software for visually or audibly producing signals. For instance, the output device(s) 624 can include one or more infrared transmitters, lighting elements (e.g., LED, etc.), display device, one or more speaker(s), etc. The handheld interactive object 602 can also include one or more communication interface(s) 626 used to communicate with one or more other component(s) of the system 600 including, for example, near range and/or over the network(s) 680. The communication interface(s) 626 can include any suitable components for interfacing with one or more network(s) 680, including for example, transmitters, receivers, ports, controllers, antennas, chips, or other suitable components.

The remote computing device 630 includes one or more processors 632 and a memory 634. The one or more processors 632 can be any suitable processing device (e.g., a processor core, a microprocessor, an ASIC, an FPGA, a controller, a microcontroller, etc.) and can be one processor or a plurality of processors that are operatively connected. The memory 634 can include one or more non-transitory computer-readable storage media, such as RAM, ROM, EEPROM, EPROM, flash memory devices, magnetic disks, etc., and combinations thereof. The memory 634 can store data 636 and instructions 638 which are executed by the processor 632 to cause the remote computing device 630 to perform operations.

As described above, the remote computing device 630 can store or otherwise include one or more remote machine-learning model(s) 640. For example, the models 640 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

In some implementations, the remote machine-learning model(s) 640 can be stored in the memory 634, and then used or otherwise implemented by the one or more processors 632. More particularly, the remote machine-learning model(s) 640 can receive movement data as input and analyze the movement data to identify a gesture action corresponding to the movement data. The remote machine-learning model(s) 640 can output the corresponding gesture action in response to the movement data. In some implementations, the remote machine-learning model(s) 640 can be configured to identify at least one gesture action of a second subset of gesture actions.

The remote computing device 630 can include one or more input devices(s) 642 and/or one or more output devices(s) 644. The input devices(s) 642 can include, for example, hardware and/or software for receiving information from a user, such as a touch screen, touch pad, mouse, data entry keys, speakers, a microphone suitable for voice recognition, etc. In some implementations, the input device(s) 642 can include sensor(s) for capturing sensor data. The output device(s) 644 can include hardware and/or software for visually or audibly producing information/signals for a user. For instance, the output device(s) 644 can include one or more speaker(s), earpiece(s), headset(s), handset(s), etc. The output device(s) 644 can include a display device, which can include hardware for displaying a user interface and/or messages for a user. By way of example, the output device(s) 644 can include a display screen, CRT, LCD, plasma screen, touch screen, TV, projector, and/or other suitable display components. In some implementations, the remote computing device 630 may not include a display device.

The remote computing device 630 can also include one or more communication interface(s) 646 used to communicate with one or more other component(s) of system 600 (e.g., handheld interactive object 602) via near range communication and/or over the network(s) 680. The communication interface(s) 646 can include any suitable components for interfacing with one or more network(s), including for example, transmitters, receivers, ports, controllers, antennas, or other suitable components.

The handheld interactive object 602 and/or the remote computing device 630 can train the models 620 and/or 640 via interaction with the training computing system 650 that is communicatively coupled over the network 680. The training computing system 650 can be separate from the remote computing device 630 or can be a portion of the remote computing device 630.

The training computing system 650 includes one or more processors 652 and a memory 654. The one or more processors 652 can be any suitable processing device (e.g., a processor core, a microprocessor, an ASIC, an FPGA, a controller, a microcontroller, etc.) and can be one processor or a plurality of processors that are operatively connected. The memory 654 can include one or more non-transitory computer-readable storage media, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned models 620 and/or 640 stored at the handheld interactive object 602 and/or the remote computing device 630 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 660 can perform a number of generalization techniques (e.g., weight decays, dropouts, etc.) to improve the generalization capability of the models being trained.

In particular, the model trainer 660 can train the models 620 and/or 640 based on a set of training data 662. The training data 162 can include, for example, a plurality of ground truth movement data (e.g., and/or one or more attributes thereof) labeled by at least one of the plurality of gesture actions (e.g., first and second subsets of gesture actions).

In some implementations, if the user has provided consent, the training examples can be provided by the handheld interactive object 602. Thus, in such implementations, the model 620 provided to the handheld interactive object 602 can be trained by the training computing system 650 on user-specific data received from the handheld interactive object 602. In some instances, this process can be referred to as personalizing the model.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors. In other implementations, the model trainer 660 includes one or more sets of computer-executable instructions that are stored in a tangible computer-readable storage medium such as RAM, hard disk, or optical or magnetic media.

The network 680 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 6 illustrates one example computing system that can be used to implement the present disclosure. Other computing systems can be used as well. For example, in some implementations, the handheld interactive object 602 can include the model trainer 660 and the training dataset 662. In such implementations, the models 620 can be both trained and used locally at the handheld interactive object 602. In some of such implementations, the handheld interactive object 602 can implement the model trainer 660 to personalize the models 620 based on user-specific data.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for handheld interactive object gesture recognition, comprising:
    receiving, by a handheld interactive object via one or more inertial measurement units, movement data indicative of a movement of the handheld interactive object;
    selecting, by the handheld interactive object, one or more local machine-learned models of the handheld interactive object or one or more remote machine-learned models of a remote computing device communicatively coupled to the handheld interactive object for processing the movement data, wherein the one or more local machine-learned models are trained to identify a first subset of gesture actions performed with the handheld interactive object and the one or more remote machine-learned models are trained to identify a second subset of gesture actions performed with the handheld interactive object;
    in response to selecting the one or more local machine-learned models, processing, by the handheld interactive object, the movement data according to the one or more local machine-learned models and communicating, by the handheld interactive object, a first message to the remote computing device based at least in part on processing the movement data according to the one or more local machine-learned models; and
    in response to selecting the one or more remote machine-learned models, communicating, by the handheld interactive object, a second message to the remote computing device, the second message comprising the movement data for processing by the remote computing device according to the one or more remote machine-learned models.

2. The computer-implemented method of claim 1, wherein in response to selecting the one or more local machine-learned models, processing the movement data according to the one or more local machine-learned models comprises:
    in response to a positive identification of at least one of the first subset of gesture actions using the one or more local machine-learned models, communicating the first message comprising data indicative of the at least one of the first subset of gesture actions to the remote computing device.

3. The computer-implemented method of claim 1, wherein in response to selecting the one or more local machine-learned models, processing the movement data according to the one or more local machine-learned models comprises:
  in response to a negative identification of at least one of the first subset of gesture actions using the one or more local machine-learned models, communicating the first message comprising the movement data for processing by the remote computing device according to the one or more remote machine-learned models.

4. The computer-implemented method of claim 1, wherein the movement data is associated with a reception time period indicative of a time during which the movement data is received, wherein selecting the one or more local machine-learned models or the one or more remote machine-learned models for processing the movement data comprises:
  receiving, by the handheld interactive object via one or more input devices, user input data associated with the reception time period; and
  selecting, by the handheld interactive object, the one or more local machine-learned models or the one or more remote machine-learned models based, at least in part, on the user input data.

5. The computer-implemented method of claim 4, wherein the one or more input devices comprise at least one interactive button, and wherein the user input data is indicative of an activation of the at least one interactive button.

6. The computer-implemented method of claim 5, wherein the user input data is indicative of the activation of the at least one interactive button at least partially during the reception time period.

7. The computer-implemented method of claim 4, wherein the first subset of gesture actions comprise one or more simple gesture actions and the second subset of gestures comprise one or more complex gesture actions, wherein the one or more simple gesture actions comprise one or more of a tap gesture or a swipe gesture, and wherein the one or more complex gesture actions comprise one or more complex movement patterns.

8. The computer-implemented method of claim 7, further comprising:
  receiving, by the handheld interactive object via the one or more inertial measurement units, initial movement data indicative of an initial movement of the handheld interactive object before the reception time period;
  identifying, by the handheld interactive object via the one or more local machine-learned models, a simple gesture action corresponding to the initial movement data, wherein the simple gesture action is indicative of an upcoming complex gesture action; and
  in response to the simple gesture action, selecting, by the handheld interactive object, the one or more remote machine-learned models for processing the movement data.

9. The computer-implemented method of claim 1, wherein:
  the first subset of gesture actions is exclusive to the second subset of gesture actions.

10. The computer-implemented method of claim 1, wherein the remote computing device comprises a mobile phone.

11. The computer-implemented method of claim 1, wherein the handheld interactive object comprises a wand-like form factor.

12. A handheld interactive object, comprising:
  one or more sensors;
  one or more processors;
  one or more communication interfaces; and
  one or more non-transitory computer-readable media that collectively store instructions that, when executed by the one or more processors, cause the handheld interactive object to perform operations, the operations comprising:
    receiving, via the one or more sensors, movement data indicative of a movement of the handheld interactive object;
    selecting one or more local machine-learned models stored by the one or more non-transitory computer readable media or one or more remote machine-learned models stored at a remote computing device communicatively connected to the handheld interactive object for processing the movement data, wherein the one or more local machine-learned models are trained to identify a first subset of gesture actions performed with the handheld interactive object and the one or more remote machine-learned models are trained to identify a second subset of gesture actions performed with the handheld interactive object;
    in response to selecting the one or more local machine-learned models, processing the movement data according to the one or more local machine-learned models and communicating, via the one or more communication interfaces, one or more first messages to the remote computing device based at least in part on processing the movement data according to the one or more local machine-learned models; and
    in response to selecting the one or more remote machine-learned models, communicating, via the one or more communication interfaces, one or more second messages to the remote computing device, the one or more second messages comprising the movement data for processing by the remote computing device according to the one or more remote machine-learned models.

13. The handheld interactive object of claim 12, wherein the movement data is associated with a reception time period indicative a time during which the movement data is received, wherein the operations further comprise:
  receiving, via one or more input devices of the handheld interactive object, user input data associated with the reception time period; and
  in response to the user input data:
  generating at least one of the one or more second messages, the at least one second message comprising data indicative of at least a portion of the movement data; and
  communicating, via the one or more communication interfaces, the at least one second message to the remote computing device.

14. The handheld interactive object of claim 13, wherein the one or more input devices comprise at least one interactive button, and wherein the user input data is indicative of an activation of the at least one interactive button at least partially during the reception time period.

15. The handheld interactive object of claim 14, wherein the at least one second message is communicated to the remote computing device during the reception time period based, at least in part, on the activation of the at least one interactive button.

16. The handheld interactive object of claim 12, wherein the remote computing device comprises a mobile phone paired to the handheld interactive object.

17. The handheld interactive object of claim 12, wherein the one or more sensors comprise an inertial measurement unit, and wherein the movement data is one or more of a velocity, an acceleration, or positional information of the handheld interactive object.

18. The handheld interactive object of claim 17, wherein the movement data is indicative of a movement pattern of the handheld interactive object.

19. One or more non-transitory computer-readable media comprising instructions that when executed by one or more computing devices cause the one or more computing devices to perform operations comprising:

receiving, via one or more inertial measurement units of a handheld interactive object, movement data indicative of a movement of the handheld interactive object;

selecting one or more local machine-learned models of the handheld interactive object or one or more remote machine-learned models of a remote computing device communicatively connected to the handheld interactive object for processing the movement data, wherein the one or more local machine-learned models are trained to identify a first subset of gesture actions performed with the handheld interactive object and the one or more remote machine-learned models are trained to identify a second subset of gesture actions performed with the handheld interactive object;

in response to selecting the one or more local machine-learned models, processing the movement data according to the one or more local machine-learned models and communicating a first message to the remote computing device based at least in part on processing the movement data according to the one or more local machine-learned models; and in response to selecting the one or more remote machine-learned models, communicating a second message to the remote computing device, the second message comprising the movement data for processing by the remote computing device according to the one or more remote machine-learned models.

20. The one or more non-transitory computer-readable media of claim 19, wherein the handheld interactive object comprises a wand-like form factor.

\* \* \* \* \*